United States Patent
Bahl et al.

(10) Patent No.: US 7,051,087 B1
(45) Date of Patent: May 23, 2006

(54) SYSTEM AND METHOD FOR AUTOMATIC DETECTION AND CONFIGURATION OF NETWORK PARAMETERS

(75) Inventors: Pradeep Bahl, Redmond, WA (US); Ramesh K. Vyaghrapuri, Kirkland, WA (US); Florin Teodorescu, Redmond, WA (US); Shirish R. Koti, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1241 days.

(21) Appl. No.: 09/587,204

(22) Filed: Jun. 5, 2000

(51) Int. Cl.
*G06F 15/16* (2006.01)

(52) U.S. Cl. .................. 709/220; 709/221; 709/222; 709/227; 709/228

(58) Field of Classification Search .............. 709/220, 709/221, 222, 227, 228
See application file for complete search history.

(56) References Cited

U.S. PATENT DOCUMENTS

| | | | | |
|---|---|---|---|---|
| 5,596,723 A * | 1/1997 | Romohr | .................. | 709/222 |
| 5,649,001 A * | 7/1997 | Thomas et al. | .......... | 379/93.07 |
| 5,852,721 A * | 12/1998 | Dillon et al. | .............. | 709/217 |
| 5,923,663 A * | 7/1999 | Bontemps et al. | ......... | 370/445 |
| 5,999,530 A * | 12/1999 | LeMaire et al. | ............ | 370/390 |
| 6,130,892 A * | 10/2000 | Short et al. | ................ | 370/401 |
| 6,212,585 B1 * | 4/2001 | Chrabaszcz | ................ | 710/302 |
| 6,263,387 B1 * | 7/2001 | Chrabaszcz | ................ | 709/220 |
| 6,412,025 B1 * | 6/2002 | Cheston et al. | ............ | 709/220 |
| 6,618,757 B1 * | 9/2003 | Babbitt et al. | ............. | 709/226 |
| 6,801,507 B1 * | 10/2004 | Humpleman et al. | ...... | 370/257 |
| 6,857,009 B1 * | 2/2005 | Ferreria et al. | ............ | 709/219 |
| 6,982,953 B1 * | 1/2006 | Swales | ....................... | 370/218 |
| 2001/0054101 A1 * | 12/2001 | Wilson | ....................... | 709/225 |
| 2002/0099634 A1 * | 7/2002 | Coutts et al. | ................ | 705/35 |
| 2002/0133573 A1 * | 9/2002 | Matsuda et al. | ............ | 709/220 |
| 2005/0256958 A1 * | 11/2005 | Wilson | ....................... | 709/227 |

OTHER PUBLICATIONS

"Microsoft Windows 2000 Server Resource Kit: Microsoft Internet Explorer 5 Resource Kit" by Microsoft Corporation. Published 1999. Printed from: <http://library.books24x7.com>.*

Feng, W., et al.; "A Self-Configured RED Gateway", IEEE INFOCOM'99. Conference on Computer Communications. Proceedings. Eighteenth Annual Joint Conference of the IEEE Computer and Communications Societies. The Future is Now vol. 3, 1999, p. 1320-1328.

* cited by examiner

*Primary Examiner*—David Wiley
*Assistant Examiner*—Alina Boutah
(74) *Attorney, Agent, or Firm*—Amin & Turocy, LLP

(57) ABSTRACT

The present invention relates to a system for automatic detection and configuration of network parameters. The system includes a first computer system for communicating to a network and at least a second computer system for providing network information. The first computer system queries the network and receives network information from the at least a second computer system before a network identification has been established for the first computer system. The system further includes a storage for storing at least one configuration associated with a network interface. The first computer system configures the network interface based upon the network information received from the at least a second computer system. Also, the first computer system may configure the network interface by determining a network identification associated with the network information and matching the at least one configuration with the network identification.

20 Claims, 13 Drawing Sheets

SYSTEM AND METHOD FOR AUTOMATIC DETECTION AND CONFIGURATION OF NETWORK PARAMETERS

TECHNICAL FIELD

The present invention relates generally to computer systems, and more particularly to a system and method for automatic configuration of network parameters wherein a network context may be detected via a network query before an IP address has been determined. A suitable configuration associated with the network query may then be selected and applied to establish a network connection.

BACKGROUND OF THE INVENTION

With the advent of laptop computer technology, network configuration and connectivity problems have increased. A problem encountered by laptop users that are active on a plurality of networks, at various points in time, relates to there being substantially no way for laptops to automatically determine which of several networks have been attached to in the past and which network configuration should be appropriately applied. Thus, when connecting to different networks, it is essential to apply a correct network configuration in order for laptops to become network operational. Unfortunately, as laptop users move between different networks, previous configurations may be overwritten, thus requiring substantial manual reconfiguration.

As an example to illustrate the above problems, consider a user who requires network connectivity at both home and work. At home, the user may have statically configured the laptop for a network connection to a cable modem provider, for example. At work, the laptop may get network configurations from a Dynamic Host Configuration Protocol (DHCP) server. However, previous home static configurations are likely be lost because when the laptop is on the corporate server, the user will likely configure their network adapter to boot from the DHCP server. The static configuration entered previously is thus overwritten. When the user transports the laptop home again, static configurations for the home network must be manually reentered. This problem becomes more acute if an increasing number of networks attached to by users require static configurations.

Another problem associated with static configurations is related to human error. For each site a laptop user visits, the user must remember correct static configurations of each network and "plumb" configurations manually. This clearly can lead to mistakes because of manual processes involved. It is noted that these problems may exist when one or more static configurations are involved. DHCP configurations may be obtained from a DHCP server and thus do not require user input.

Although users may save static configuration settings for each network and subsequently apply them manually, as noted above, manual processes are both error prone and time consuming. Currently, there is no automatic way of applying static configurations to various networks. Consequently, there is a strong need in the art for enhancing laptop network connectivity by mitigating static configuration requirements.

SUMMARY OF THE INVENTION

The present invention is related to a system and method for automatic configuration of network parameters when connecting to a plurality of variously configured networks. In accordance with the present invention, a laptop and/or other computer first determines which network has been attached to and then applies a stored configuration related to that network, and thus automatically enables network operations. This substantially reduces errors in applying manual configurations and saves time establishing network connections.

More particularly, the present invention may employ a multicast to query other network machines to discover a network number. Upon discovery of the network number, a search of stored network configurations associated with the network number may then be performed. If a corresponding configuration is found pertaining to the network number, the configuration may be applied and network configuration is thereby complete. It is noted that the multicast operation described above may be performed before a network address has been established for any suitable device and/or system requiring a network configuration. It is further noted that conventional systems generally establish a network address before performing substantially any type of network communications.

In cases wherein no other host machine on the network supports the present invention, an Address Resolution Protocol (ARP) broadcast may be performed wherein an Internet Protocol (IP) address is transmitted. The ARP is directed to routers specified in stored network configurations. If any machine on the network responds to the ARP, then the stored configuration associated with the ARP is applied. If there is no corresponding response to the ARP, other heuristics may be employed. These heuristics may include, for example, performing a sequential and/or incremental variance of network parameters, applying the variance to the network and subsequently testing for a response. Furthermore, if no network configurations have been previously stored, multicasts and/or ARP's may be employed to determine/learn a basic network configuration based upon responses received from the multicast and/or ARP.

As described above in reference to multicast operations, the ARP may be performed before a network address has been established for any suitable device and/or system requiring a network configuration. Conventional systems generally require a network address before performing substantially any type of network communications. Thus, the present invention provides a system and methodology for enabling a system to become network operational, via the network, before the system has been configured to communicate over the network.

As will be described in more detail below, automatic detection of network parameters may rely on knowledge of network parameters shared by other computers already connected to the network. The computer system joining the network may then query via its interface for parameters that define the network. In this manner, the computer system may communicate with other computer systems coupled to the network—even before establishing a network identification for itself.

Another aspect of the invention relates to the concept of multiple user-defined network configurations. These configurations may be stored on the computer system joining the network. During the process of joining the network, the computer system gathers information (e.g., network parameters) regarding the network by the automatic detection process described above. Network parameters obtained in this manner may be employed to locate a user-defined configuration corresponding to the network. When a user-defined configuration has been located and applied to a network interface, an automatic configuration portion of the present invention provides an extended set of network parameters and enables full connectivity to the network. If no user-defined configuration is available when the computer system connects to the network, the automatic configuration portion of the present invention may dynamically infer a configuration from information obtained from the network and thereby establish the configuration for future connection attempts.

Another aspect of the invention relates to the computer system described above becoming a holder of network parameters upon successfully joining the network. Thus, the computer system may then answer queries emitted from other computer systems that may identify and join the network via the automatic detection process described above.

According to one aspect of the invention, a system for automatic detection and configuration of network parameters is provided. The system includes a first computer system for communicating to a network and at least a second computer system for providing network information. The first computer system queries the network and receives the network information from the second computer system before a network identification has been established for the first computer system.

Another aspect of the invention relates to a methodology for automatic detection and configuration of network parameters. A network is queried, and a response is received from the network. A network interface is configured before a network identification has been established based upon the response from the network. The network identification is established based upon the response from the network.

Another aspect of the invention relates to a system for automatic detection and configuration of network parameters. The system includes: means for querying a network; means for receiving a response from the network; and means for configuring a network interface before a network identification has been established based upon the response from the network.

Yet another aspect of the invention relates to a system for automatic detection and configuration of network parameters. The system includes a first computer system having a network interface and a storage for storing at least one configuration associated with a network. The system further includes at least a second computer system for providing network information. The first computer system configures the network interface by determining a network identification associated with the network information received from the second computer system and matching the configuration with the network identification.

Another aspect of the present invention relates to a system for automatic detection and configuration of network parameters. The system includes a first computer system having a network interface. A storage stores at least one configuration associated with a network. At least a second computer system provides network information. The first computer system queries the at least a second computer system via the network interface to receive the network information before a network identification has been established for the first computer system. The first computer system configures the network interface by determining a network identification associated with the network information and matching the at least one configuration with the network identification.

To the accomplishment of the foregoing and related ends, the invention then, comprises the features hereinafter fully described. The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

Figure 1:
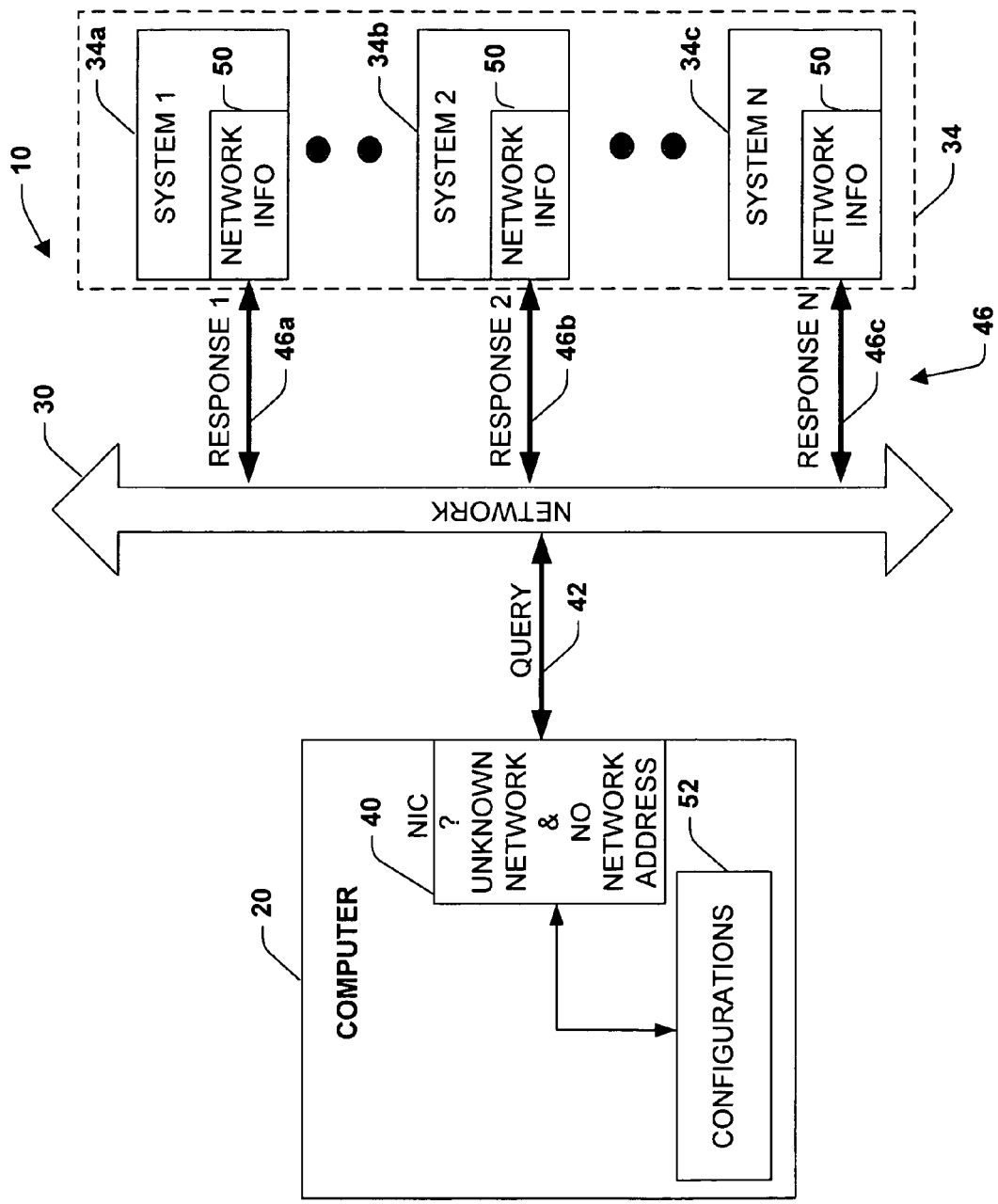
FIG. 1 is a schematic block diagram illustrating an automatic network detection and configuration system in accordance with one aspect of the present invention.

The present invention is now described with reference to the drawings, wherein like reference numerals are used to refer to like elements throughout.

In accordance with the present invention, a system and method is provided that enables a machine (e.g., laptop computer) to discover a network that the machine may become attached to and subsequently applying a network configuration related thereto. This substantially automates network configuration and mitigates manual configurations associated with conventional systems. Moreover, valuable time is saved by mitigating human errors and manual entry procedures associated with conventional systems.

Referring initially to FIG. 1, a system 10 illustrates a particular aspect of the present invention related to automatic detection and configuration of network parameters. A computer system 20 is shown operatively coupled to an exemplary network 30 with a plurality of network systems 34a through 34c, hereinafter referred to as network system 34, coupled thereto. Upon connecting to the network 30 and before a network configuration may be established, the computer 20 may direct a Network Interface Card (NIC) 40, for example, to communicate via the network 30. Initially, the computer 20 is without a network address and as with conventional systems, would be unaware of the particular network 30 attached thereto.

In accordance with the present invention, even though the NIC 40 has not been given a network address and configured to communicate with the network 30, a query 42 may be directed to the network 30 in order to determine a suitable network configuration 52. After sending the query 42, the computer 20 may listen for a response from the network systems 34 that are adapted to provide a response 46a through 46c, hereinafter referred to as responses 46. The responses 46 may include network information 50 and may be directed to the source of the query 42—in this case, for example, the computer 20. As will be described in more detail below, the responses 46 may be provided as a result of the network system 34 receiving a multicast and/or broadcast address in which to respond. According to another aspect of the present invention, the response may alternatively be sent to a standard multicast address that machines configured according to this invention respond to. For example, the multicast address may be the same as the address to which the request was sent.

If a response 46 is received by the computer 20, a determination may be made, based upon the network information 50, as to the appropriate configuration for the NIC 40. For example, the computer 20 may have previously stored at least one network configuration 52. The computer 20 may then interpret the network information 50 and determine whether the network configuration 52 correlates therewith. If the stored configuration 52 correlates with the network information 50, then the configuration 52 may be applied to the NIC 40. It is noted that the responses 46, which are shown as response 1 through response N, may be staggered wherein each system 34a through 34c provides network information 50 at suitable points in time such that network 30 communications are minimally affected and such that network bandwidth is conserved. This may be achieved, for example, such that if one network system responds, other systems listening to the response will not respond. Redundant responses are therefore advantageously mitigated.

It is noted that other computers attempting to determine their network configuration may determine the configuration from the response 50 that was multicast and/or broadcast as a result of the query 42 from the computer 20. In this manner, other computers (not shown) attaching to the network 30 may start listening for responses, and if a response is received before the other computers send their responses, then the other computers need not send a request for network information. Alternatively, if a router (not shown) is present on the network, the router may transmit such network configuration information periodically, wherein computers may learn their network configurations from the periodic transmissions.

The computer 20 may have a plurality of possible configurations 52 for the NIC 40 and/or other network cards (not shown) that may reside thereon. A configuration 52 may exist for each network 30 and NIC 40 that has been configured over time, for example. The configurations 52 may be determined from previous network operations and/or provided statically from a system administrator for example, and may be saved in some persistent storage (not shown) on the computer 20. The configurations 52 may be static and/or dynamic.

In a static configuration 52 for example, the configurations may be input and/or downloaded manually and remain essentially static unless manually removed. This may include for example, an Internet Protocol (IP) address, a subnet address—an address of a sub-network for which the IP address is valid, a subnet mask—a bit pattern that when applied to an IP address yields the subnet address, and a name server address.

In a dynamic configuration 52, the configuration 52 may be acquired from a Dynamic Host Configuration Protocol (DHCP) server and/or BOOTP server(not shown) employing DHCP protocol. A dynamic configuration may have a certain lifetime known as the lease time. Network configurations 52 acquired via DHCP or BOOTP may change on lease expiration or when the computer 20 moves to another network and thus receives a new configuration from a DHCP or BOOTP server on the new network. It is noted that the present invention may provide automatic configuration of previously stored static and/or dynamic configurations when no DHCP or BOOTP server is available. If the computer system 20 connects to a system having a DHCP and/or BOOTP, network configurations may be alternatively received from the DHCP or BOOTP.

Figure 2:
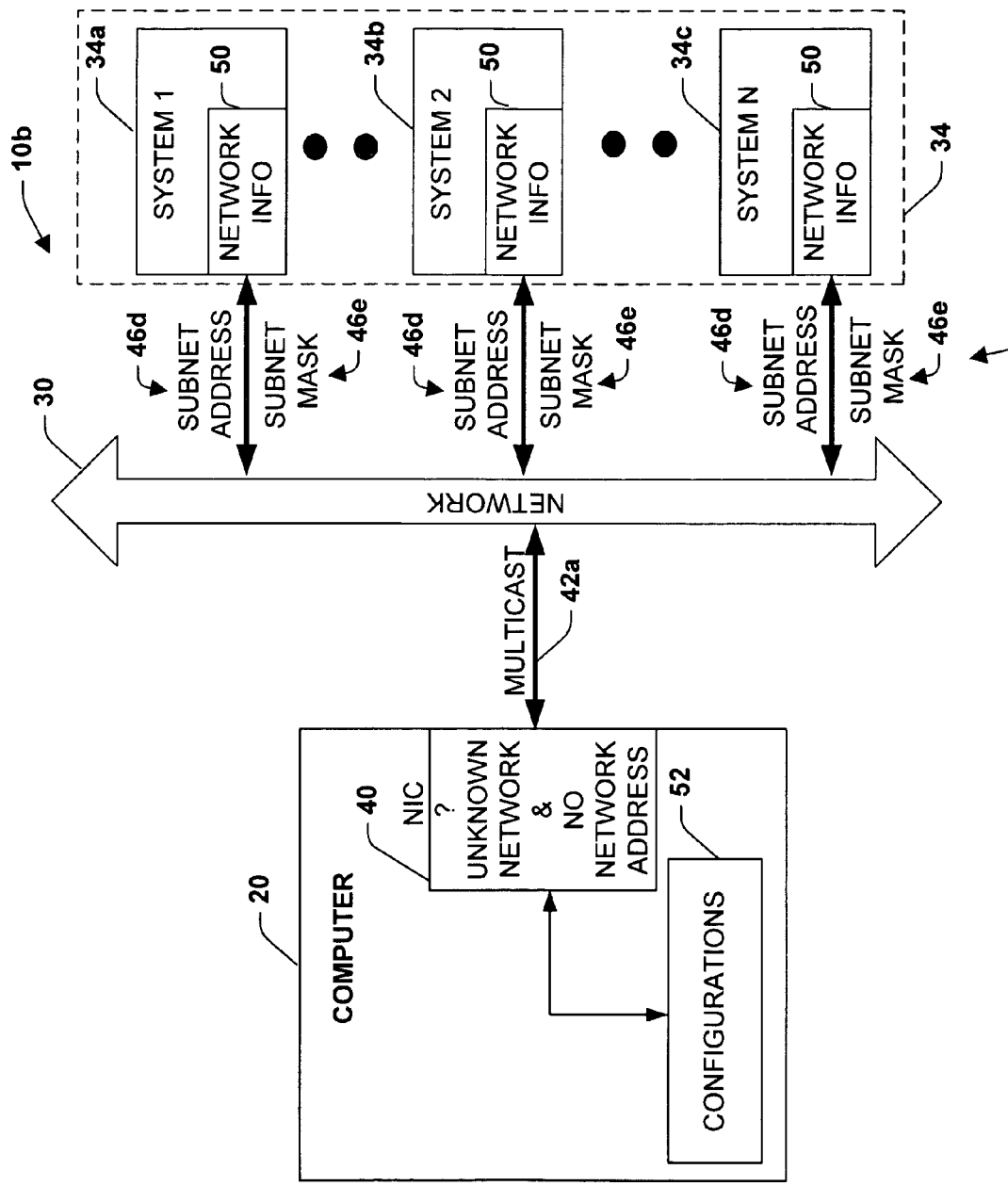
FIG. 2 is a schematic block diagram illustrating an automatic network detection and configuration system employing a multicast in accordance with one aspect of the present invention.

Now referring to FIG. 2, a system 10b illustrates one particular aspect of the present invention for providing automatic configuration of network parameters. A multicast 42a, for example, may be employed to query the network 30 for network information 50. Multicasting provides a process wherein messages may be transmitted to a select group of machines. As will be described in more detail below, a predetermined address may be defined in a portion of a message (See e.g., reference numeral 60b in FIG. 4a) to be multicast. The network systems 34 which have been adapted to respond to the multicast 42a may then respond, for example, by providing a subnet address 46d and subnet mask 46e. As will be described in more detail below, the subnet address 46d and subnet mask 46e are received by the computer 20 to determine a network number wherein a suitable network configuration 52 associated therewith may be selected. Thus, automatic configuration of the NIC 40 is achieved thereby mitigating manual processes associated with conventional systems. It is noted that the multicast 42a, in contrast to a broadcast wherein all machines on a network are sent a message, suitably avoids disturbing legacy systems that may not support the present invention.

Figure 3:
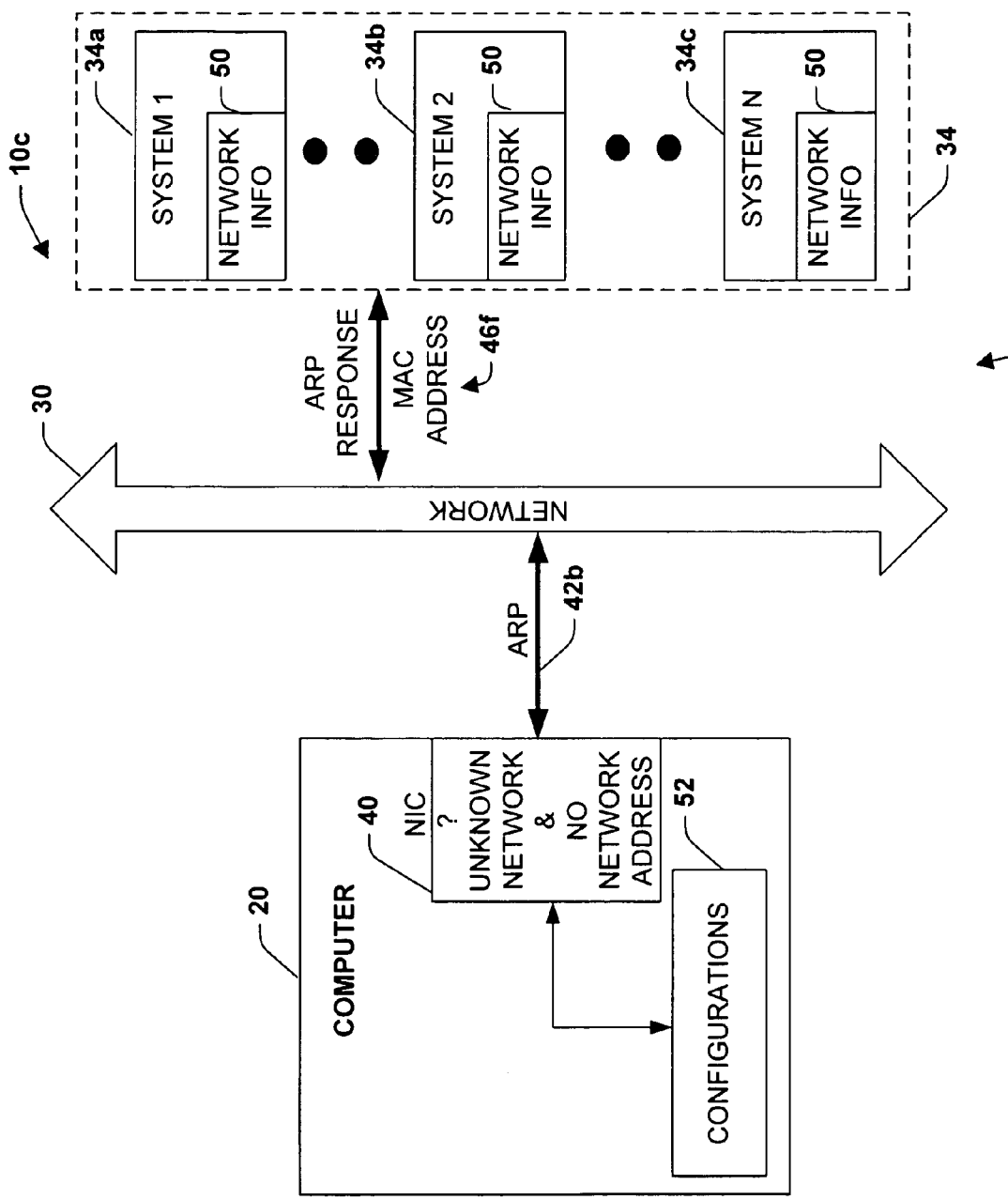
FIG. 3 is a schematic block diagram illustrating an automatic network detection and configuration system employing Address Resolution Protocol in accordance with one aspect of the present invention.

Turning now to FIG. 3, a system 10c illustrates an alternative aspect of the present invention wherein the network systems 34 may not have responded to the multicast 42a described above. If no network systems 34 on the network 30 respond to the multicast described above (e.g., no systems running software in support of the present invention), the computer 20 may initiate an Address Resolution Protocol (ARP) broadcast 42b to the network 30. The ARP broadcast 42b determines whether a network system 34 is existent on the network 30 and may include an IP address specified in the configurations 52. Any suitable system 34, for example, having the IP address referred to in the broadcast 42b may respond to the ARP 30 by sending a MAC address 46f. For example, the MAC address 46f may represent a physical Ethernet address of a network card of the system 34 associated with the aforementioned IP address. In accordance with the present invention, the ARP broadcasts 42b may be directed from router information (e.g., carrying the router's network address) specified in the static and/or dynamic configurations 52 described above. If a MAC address 46f is sent in response to the ARP 42b, the configuration 52 pertaining to the router associated therewith may be applied to the NIC 40. Thus, automatic configuration of the NIC 40 may be similarly achieved.

In accordance with an alternative aspect of the present invention, and if no configurations 52 relate to responses received from the network systems 34 (e.g., coupling to the network for the first time), other processes may be employed to determine a suitable NIC 40 configuration. For example, multicasts and/or ARPs described above may be employed to generate a response 46. From received responses 46, the computer 20 may determine a basic network configuration by interpreting the response 46. The interpretation process may include forming a subnet address that is adjusted from the received response addresses and by subsequently sending ARPs and/or multicasts to test the proposed configuration.

Alternatively, configurations 52 may be determined by sending messages according to alternative modifications of configurations 52 previously stored. These messages may be for example, based on slight modifications (e.g., adjusting an IP address sequentially by 1, 2 etc.) to existing configurations 52. It is to be appreciated that other heuristics may be employed.

Figure 4A:
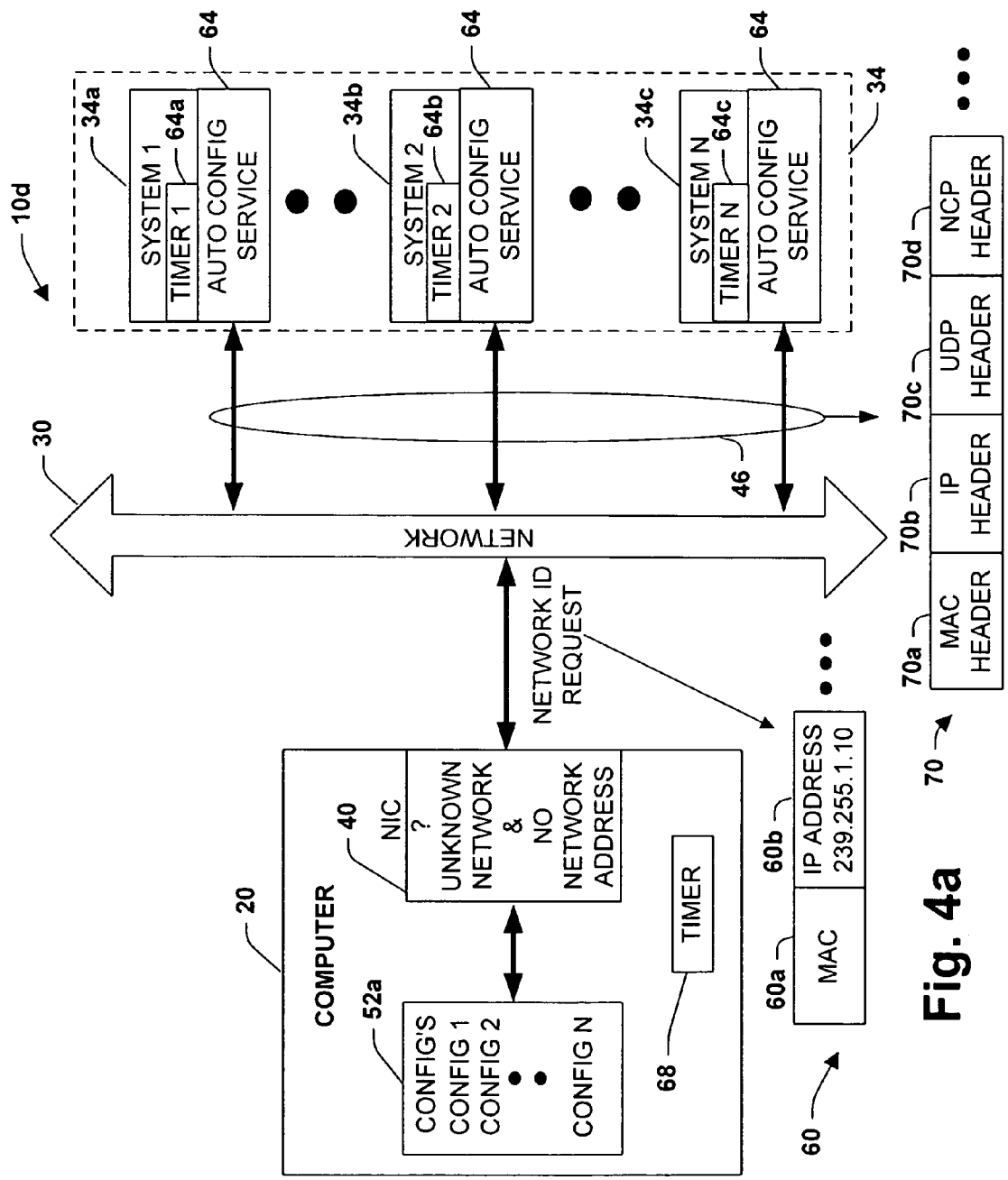
FIG. 4a is a schematic block diagram illustrating an automatic network detection and configuration system and associated protocol in accordance with one aspect of the present invention.

Referring now to FIG. 4a, a system 10d illustrates a particular aspect for a system implementation in accordance with the present invention. The system 10d depicts a particular aspect of multicasting and/or ARP broadcasting to obtain network information such that an automatic configuration of the NIC may be achieved. Automatic configuration may be achieved by determining a configuration table 52a that provides an available list of at least one predetermined (e.g., static/dynamic configuration described above) configuration to be applied to the NIC 40 upon a determination of a network identification/context.

To determine a network identification, a network ID request 60 may be multicast to a network system 34 wherein an automatic configuration service 64 may be adapted to respond thereto. The network ID request 60 may include a MAC packet 60a as is well understood in the art, and a multicast packet 60b assigned for the automatic configuration service 64. For example, the multicast packet 60b may be addressed to a predetermined multicast address of 239.255.1.10. It is to be appreciated that other suitable addresses may be selected. Although not shown in FIG. 4a, the network ID request may further include a source IP address of 0.0.0.0. A timer 68 may also be provided to initiate alternative (e.g., ARP) processes within the computer 20 if a response is not received from the network ID request 60.

Upon receiving the network ID request 60, the automatic configuration service 64 may generate a response packet 70 defining network parameters such that the computer 20 may select a suitable configuration 52a. The response packet 70 may include a MAC header 70a, and an IP header 70b as are well understood in the art. A User Datagram Protocol (UDP) header 70c may be included to indicate a suitable Network Configuration Protocol (NCP) header 70d. The NCP header 70d may include a subnet address and subnet mask of the network in which the response packet 70 was received. It is noted that the response packet 70 may alternatively be multicast as a UDP packet.

Upon receiving the response packet 70, the computer 20 may determine a network number (not shown) corresponding to the subnet address provided by the NCP header 70d. The configuration table 52a may then be searched to determine if at least one of the configurations 1 through N match the network number. If a match is found, the configuration corresponding thereto may then be applied to the NIC 40 wherein automatic network configuration may be achieved.

As will be described in more detail below in relation to FIG. 4b, if a response packet 70 is not received by the computer 20, an ARP broadcast may be initiated. The broadcasts may be to query the MAC address of one of the routers defined in the configuration table 52a. If a response is received from the ARP broadcast, the configuration associated with the responding router address may then be applied. It is noted, as will be described in more detail below, that the automatic configuration service 64 may include a timer, shown as timers 64a–64c, 1 through N, for minimizing network traffic and responses during the automatic configuration process.

Figure 4B:
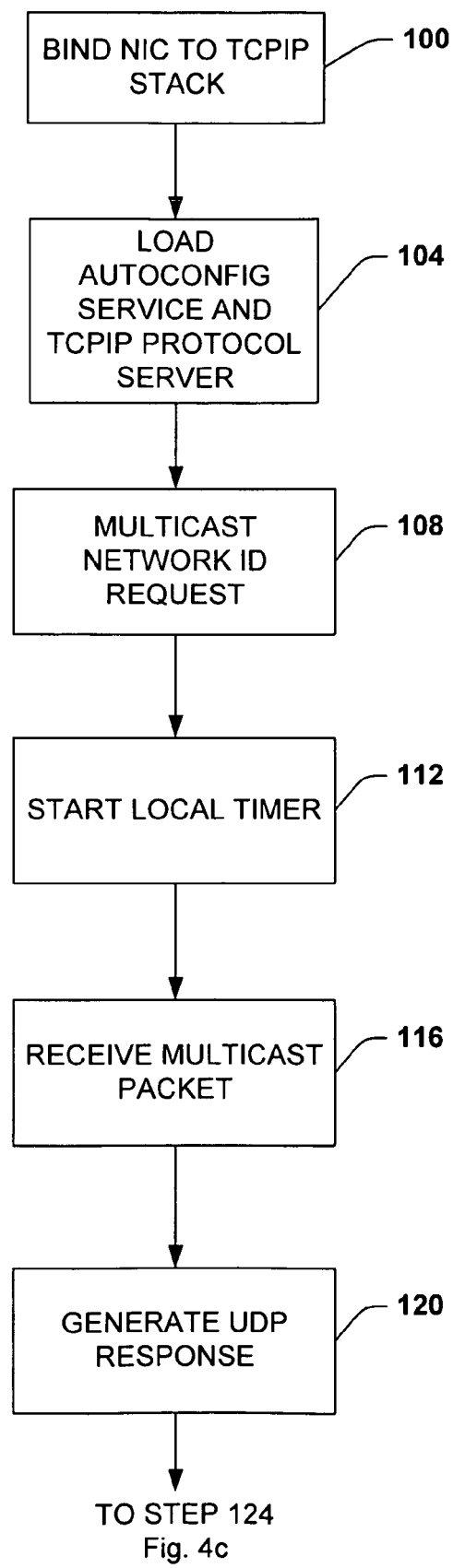
FIGS. 4b–4e is a flow chart diagram depicting a methodology for an automatic detection and configuration system in accordance with one aspect of the present invention.

Referring now to FIG. 4b, a methodology is depicted for carrying out an aspect of the present invention as illustrated in FIG. 4a. A process is described wherein a machine (e.g., laptop computer) may determine a network that is being connected to. After the network determination, a configuration may be "plumbed" (e.g., applied) to enable network operations. The process described for "network detection" begins at step 100 of FIG. 4b.

At step 100, a machine boots up and a network card (e.g., NIC) gets bound to a TCPIP stack. It is noted, that the network card currently has no network address assigned. At step 104 an auto-configuration service may be started on at least one network system 34 and a TCPIP protocol driver may be loaded and bound to the network card and/or cards on the machine. At step 108 an "auto-discovery" process may be initiated by multicasting a "network ID request" packet to a predetermined multicast address that is assigned for the auto-configuration service. The packet may have a 0.0.0.0, for example, as a source address in an IP header. At step 112, the machine may start a "local" timer for a predetermined time interval and subsequently wait for a response as described below.

Figure 4C:
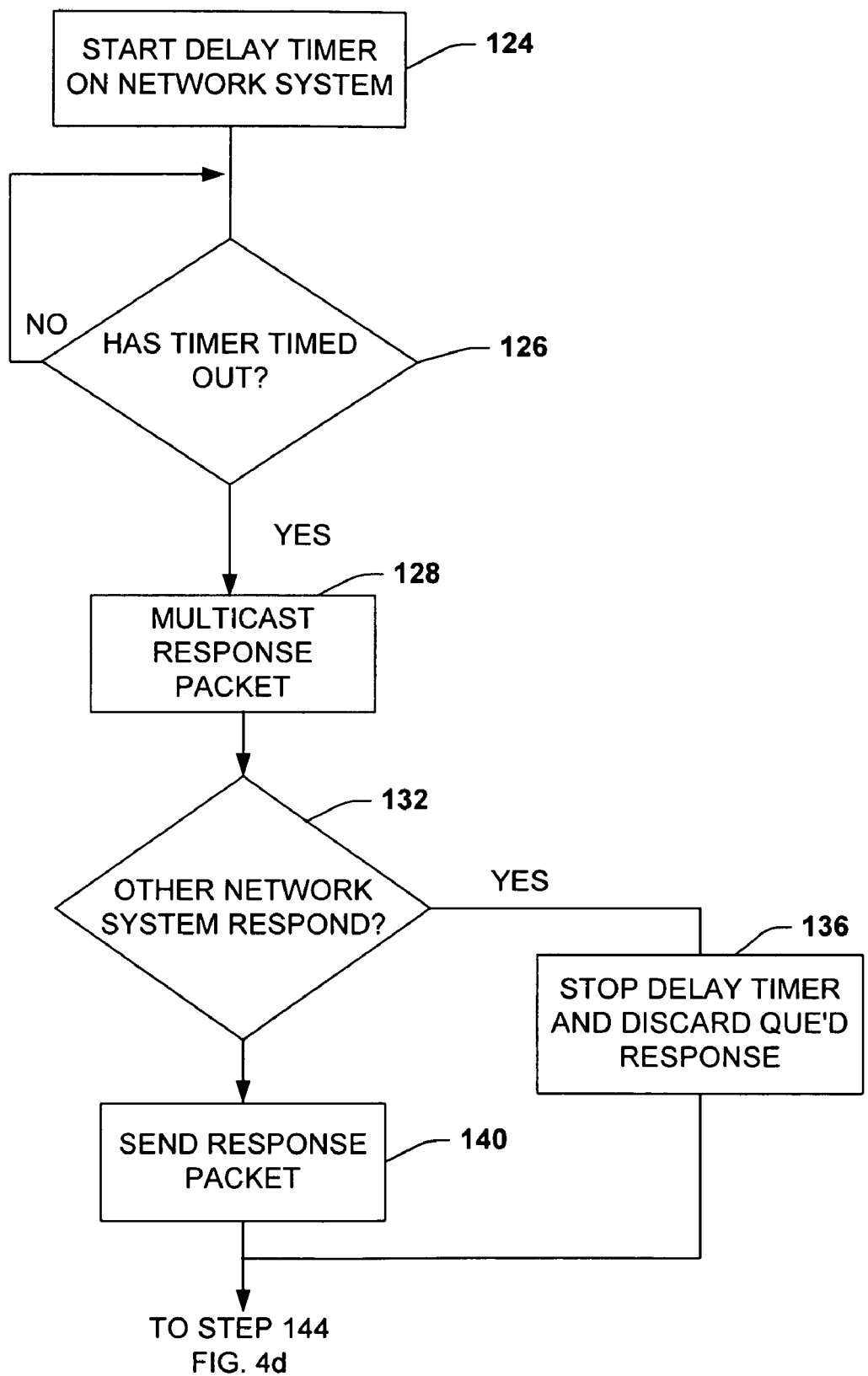

At step 116, network systems 34 that have been configured with the auto-configuration service accept the multicast packet for processing by the service. At step 120, the auto-configuration service on the network system may assemble a UDP (User Datagram Protocol belonging to the TCPIP suite of protocols) response packet that contains a "subnet address" and "subnet mask" of the network over which the packet was received. The process then proceeds to step 124 in FIG. 4c.

At step 124, the network system may start a delay timer with an associated delay time. The delay time may be proportional to a "hash" value of the primary IP address of the network card over which the request was received and response may be sent. For example, the delay time may be determined from a composite (e.g., hashed) value of the primary IP address to make the time delay value different for each network system running the auto-configuration service. This minimizes the probability of two respondents responding at the same time and subsequently mitigates network traffic during auto-configuration.

At step 126, the delay timer is checked to determine if the timer has timed out. If the timer has not timed out, the process proceeds back to step 126. If the timer has timed out at step 126, the process proceeds to step 128. At step 128, a response is multicast and may be sent to the same address as the one to which the "network request" packet was previously sent. Alternatively, different predetermined multicast addresses may be employed—an address for the request, and another address for the response wherein the computer may listen on both addresses for requests and responses from other systems on the network. The network request packet may therefore be received by all network systems running the auto-configuration service.

Figure 4D:
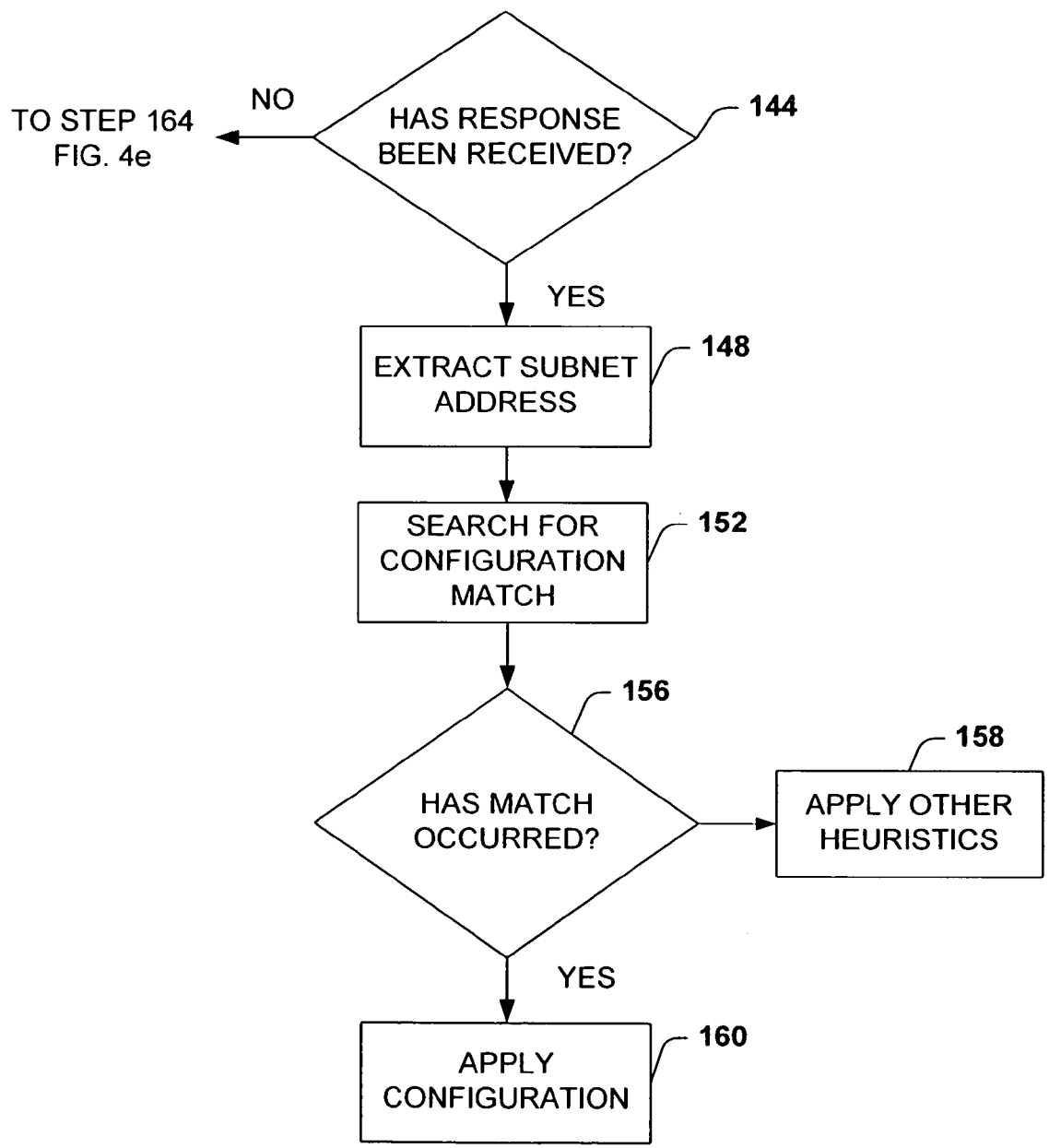

At step 132 a potential network system respondent determines if another network system respondent provided similar subnet information that the potential network respondent was about to send. If a response has been sent, the process proceeds to step 136 and the network system stops its delay timer, discards the queued response and proceeds to step 144. This mitigates multiple redundant responses from being sent on the network. If a response has not been detected from another network system 34 at step 132, the process proceeds to step 140 and sends a response to the requesting machine as described above. From step 140, the process proceeds to step 144 illustrated in FIG. 4d.

At step 144, the machine that multicast the network ID request determines if a response is received before the local timer has timed out. If the local timer has timed out before the response is received, the process may proceed to step 164 which is described in more detail below. Alternatively, although not shown, the process may optionally send a plurality of network ID requests by returning back to step 112 a predetermined number of times (e.g., digital filter for noisy systems) before proceeding to step 164. If a response is received at step 144, the local timer started in step 112 may be reset to indicate that a response was received. If the local timer has not timed out before receiving a response, the process proceeds to step 148.

At step 148, the subnet address as described above may be extracted from the response. Alternatively, the subnet address may be determined by applying the subnet mask to the IP address in the response header. At step 152, the machine searches for a subnet address "match" in stored configurations resident on the machine. At step 156, a determination is made as to whether a match has occurred between the response and the stored configurations. If there is a match at step 156, the process proceeds to step 160 and applies the matching network configuration to a network stack and thus, the machine becomes operational on the network. Consequently, automatic detection and configuration of network parameters is complete. If there is no matching configuration at step 156, the process proceeds to step 158 wherein other heuristics may be applied such as multicasting and/or providing ARP broadcasts in sequential relation to the stored configurations as described above.

Figure 4E:
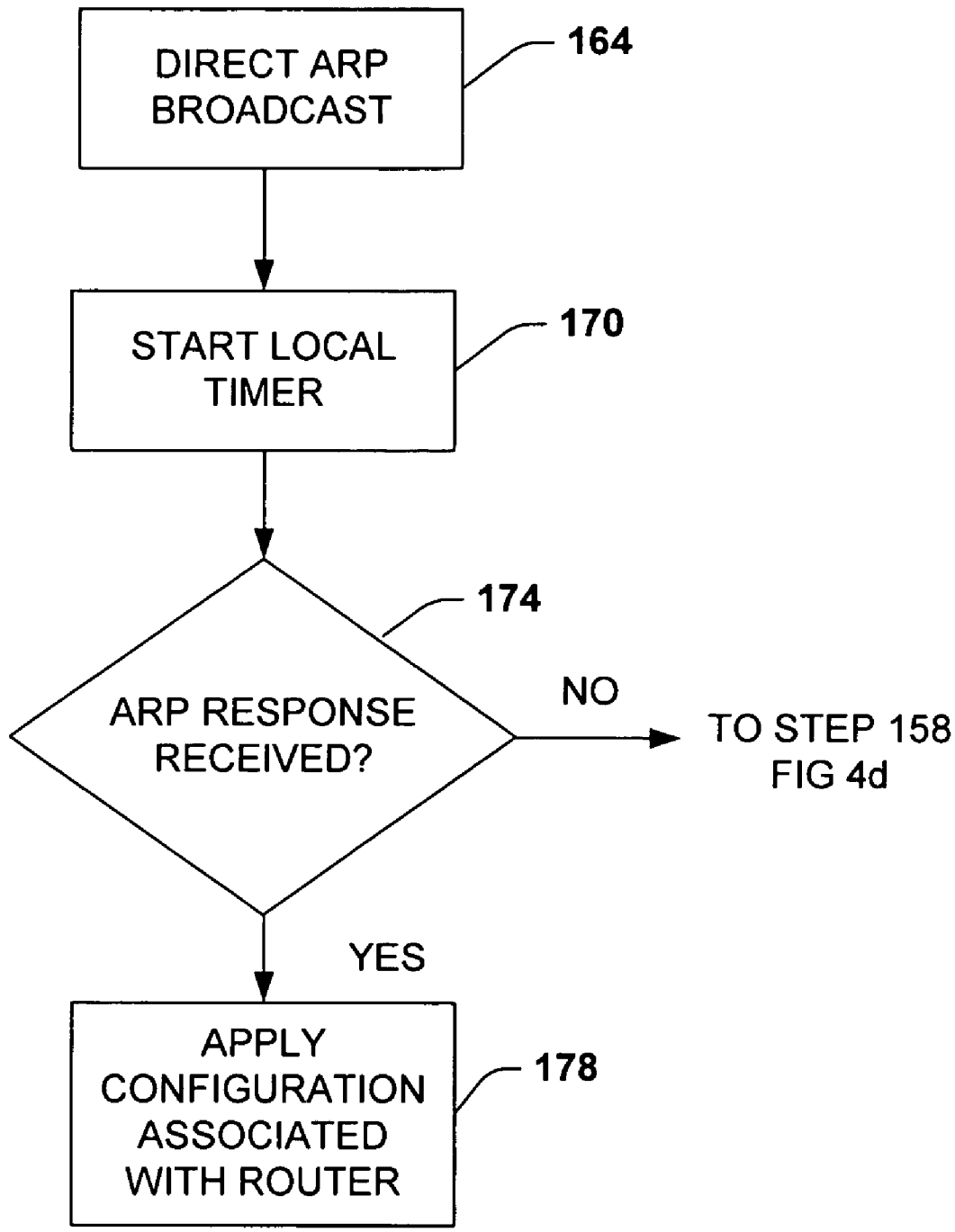

If there were no network systems running an auto-configuration service, no response would have been received at step 144 above, and the local timer would time-out waiting for a response. As described above, if the local timer times out at step 144, the process then proceeds to step 164 illustrated in FIG. 4e.

Beginning at step 164 an alternative process for providing auto-configuration of network parameters may be employed. At step 164, an Address Resolution Packet (ARP) may be directed to each router specified in the static and/or dynamic configurations stored on the machine. At step 170, a local timer may again be started to indicate a length of time to wait for the ARP response. At step 174, a determination is made as to whether a response was received before the local timer has timed out. If a response was received at step 174 from at least one of the addressed routers, a corresponding configuration associated with the router may be applied to the machine at step 178, and thus automatic configuration of network parameters is complete.

If there was no response to the ARP packets at step 178 the process may proceed to step 158 wherein other heuristics may be applied as described above. A lack of response at step 178 may indicate that none of the stored configurations' routers are on the attached network or that one of the stored configurations is valid but the associated router is down and/or not responding.

Figure 5:
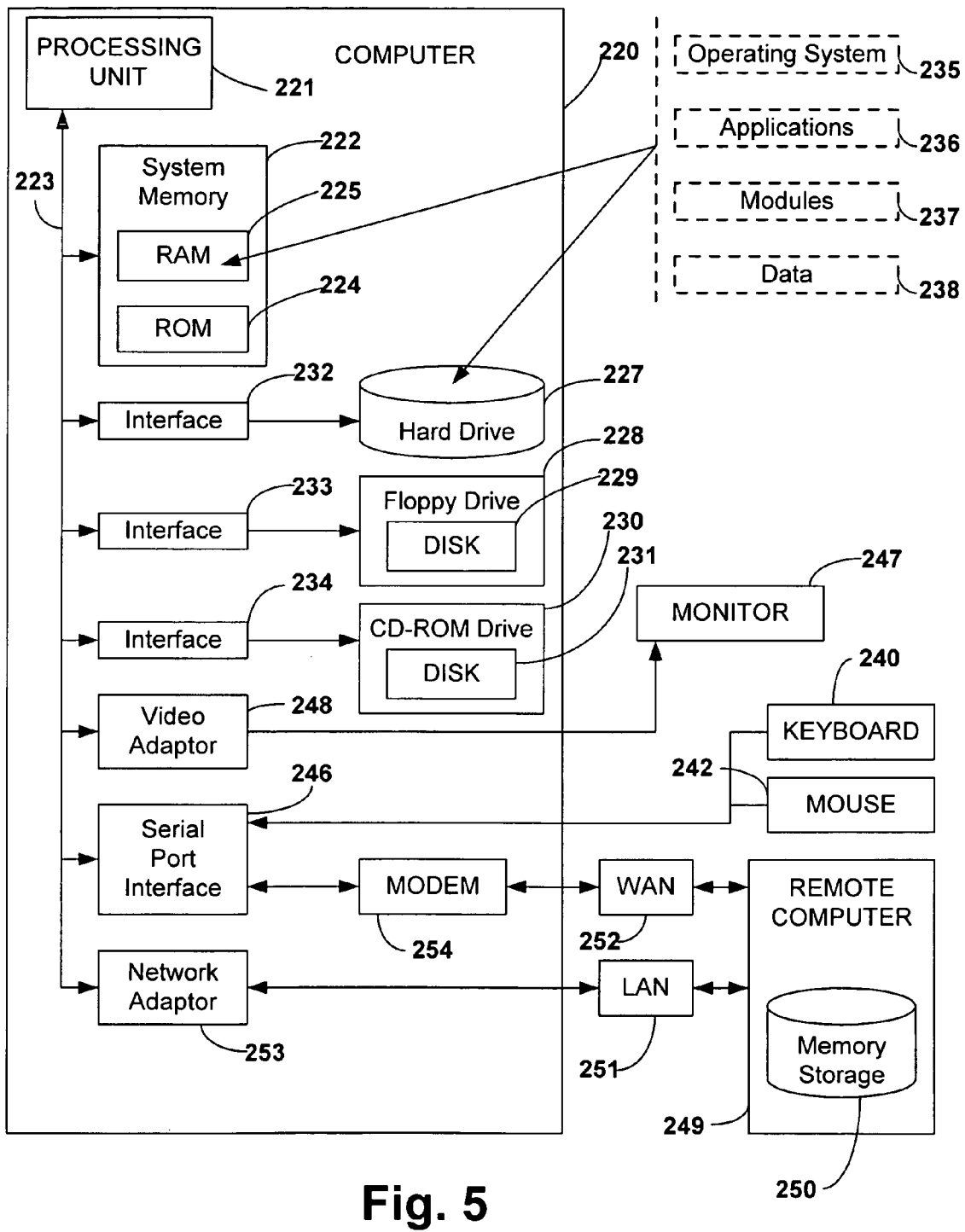
FIG. 5 is a schematic block diagram illustrating a system in accordance with one aspect of the present invention.

In order to provide a context for the various aspects of the invention, FIG. 5 and the following discussion are intended to provide a brief, general description of a suitable computing environment in which the various aspects of the present invention may be implemented. While the invention has been described above in the general context of computer-executable instructions of a computer program that runs on a computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like. The illustrated aspects of the invention may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 5, an exemplary system for implementing the various aspects of the invention includes a conventional server computer 220, including a processing unit 221, a system memory 222, and a system bus 223 that couples various system components including the system memory to the processing unit 221. The processing unit may be any of various commercially available processors, including but not limited to Intel x86, Pentium and compatible microprocessors from Intel and others, including Cyrix, AMD and Nexgen; Alpha from Digital; MIPS from MIPS Technology, NEC, IDT, Siemens, and others; and the PowerPC from IBM and Motorola. Dual microprocessors and other multi-processor architectures also can be used as the processing unit 221.

The system bus may be any of several types of bus structure including a memory bus or memory controller, a peripheral bus, and a local bus using any of a variety of conventional bus architectures such as PCI, VESA, Microchannel, ISA and EISA, to name a few. The system memory includes read only memory (ROM) 224 and random access memory (RAM) 225. A basic input/output system (BIOS), containing the basic routines that help to transfer information between elements within the server computer 220, such as during start-up, is stored in ROM 224.

The server computer 220 further includes a hard disk drive 227, a magnetic disk drive 228, e.g., to read from or write to a removable disk 229, and an optical disk drive 230, e.g., for reading a CD-ROM disk 231 or to read from or write to other optical media. The hard disk drive 227, magnetic disk drive 228, and optical disk drive 230 are connected to the system bus 223 by a hard disk drive interface 232, a magnetic disk drive interface 233, and an optical drive interface 234, respectively. The drives and their associated computer-readable media provide nonvolatile storage of data, data structures, computer-executable instructions, etc. for the server computer 220. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment, and further that any such media may contain computer-executable instructions for performing the methods of the present invention.

A number of program modules may be stored in the drives and RAM 225, including an operating system 235, one or more application programs 236, other program modules 237, and program data 238. The operating system 235 in the illustrated computer may be a Microsoft operating system (e.g., Windows NT server), however, it is to be appreciated that other operating systems may be employed.

A user may enter commands and information into the server computer 220 through a keyboard 240 and a pointing device, such as a mouse 242. Other input devices (not shown) may include a microphone, a joystick, a game pad, a satellite dish, a scanner, or the like. These and other input devices are often connected to the processing unit 221 through a serial port interface 246 that is coupled to the system bus, but may be connected by other interfaces, such as a parallel port, a game port or a universal serial bus (USB). A monitor 247 or other type of display device is also connected to the system bus 223 via an interface, such as a video adapter 248. In addition to the monitor, computers typically include other peripheral output devices (not shown), such as speakers and printers.

The server computer 220 may operate in a networked environment using logical connections to one or more remote computers, such as a remote client computer 249. The remote computer 249 may be a workstation, a server computer, a router, a peer device or other common network node, and typically includes many or all of the elements described relative to the server computer 220, although only a memory storage device 250 is illustrated in FIG. 5. The logical connections depicted in FIG. 5 include a local area network (LAN) 251 and a wide area network (WAN) 252. Such networking environments are commonplace in offices, enterprise-wide computer networks, intranets and the Internet.

When used in a LAN networking environment, the server computer 220 is connected to the local network 251 through a network interface or adapter 253. When used in a WAN networking environment, the server computer 220 typically includes a modem 254, or is connected to a communications server on the LAN, or has other means for establishing communications over the wide area network 252, such as the Internet. The modem 254, which may be internal or external, is connected to the system bus 223 via the serial port interface 246. In a networked environment, program modules depicted relative to the server computer 220, or portions thereof, may be stored in the remote memory storage device. It will be appreciated that the network connections shown are exemplary and other means of establishing a communications link between the computers may be used.

In accordance with the practices of persons skilled in the art of computer programming, the present invention has been described with reference to acts and symbolic representations of operations that are performed by a computer, such as the server computer 220, unless otherwise indicated. Such acts and operations are sometimes referred to as being computer-executed. It will be appreciated that the acts and symbolically represented operations include the manipulation by the processing unit 221 of electrical signals representing data bits which causes a resulting transformation or reduction of the electrical signal representation, and the maintenance of data bits at memory locations in the memory system (including the system memory 222, hard drive 227, floppy disks 229, and CD-ROM 231) to thereby reconfigure or otherwise alter the computer system's operation, as well as other processing of signals. The memory locations where such data bits are maintained are physical locations that have particular electrical, magnetic, or optical properties corresponding to the data bits.

Figure 6:
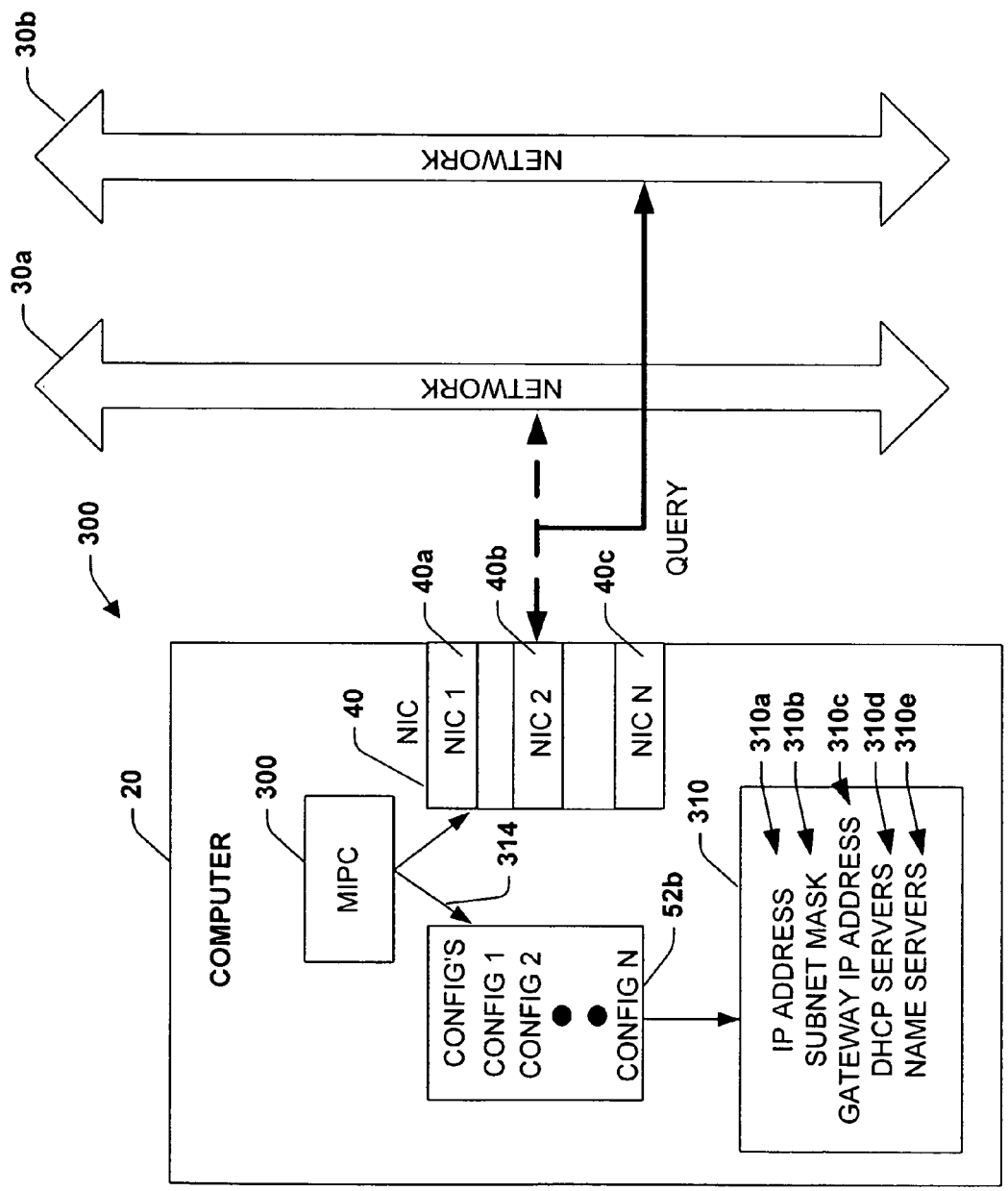
FIG. 6 is a schematic block diagram illustrating a Multiple IP Configurations (MIPC) service for an automatic network detection and configuration system in accordance with one aspect of the present invention.

Turning now to FIG. 6, a Multiple IP Configurations (MIPC) service 300 illustrates an aspect of the present invention. The MIPC 300 architecture enables a machine to detect and configure substantially automatically a plurality of network interfaces depending on the network (e.g., network 30*a*, 30*b*) the machine may be connected to. A particular aspect of the MIPC 300 relates to a computer 20 (e.g., laptop) being moved from one network 30*a* to another network 30*b* (e.g., from home to work, from one enterprise to another, etc.), or when a computer regularly utilizes various locations to connect to the same network and/or networks.

A connection's context is generally different from network to network, and network parameters may be obtained in various ways. For example, a grouping of network parameters 310 may generally include: an IP address 310*a*, a subnet mask 310*b*, a Gateway IP address 310*c*, one or more DHCP servers 310*d*, and/or name servers, 310*e* etc. These parameters 310 may generally be obtained dynamically via a DHCP server (not shown). Alternatively, if a DHCP server is not provided, an IP address 310*a* and subnet mask 310*b* may be obtained via an auto-configuration service described above. Additionally, network parameters 310 may be provided statically, as configured by a system Administrator, for example.

A feature of the MIPC architecture 300 is to mitigate having NIC's 40, as described above, reconfigured manually each time a connection's context is changed. The MIPC service 300 may include a set of possible configurations 52*b* based upon past network configurations and/or predetermined configurations and may dynamically select and apply to each NIC 40 a particular configuration 52*b* that corresponds to a current network context.

The MIPC service 300 may be configured to enable system administrators to define, initialize and update a set of user-defined network configurations 52*b*, define a semantic for auto-detecting a particular configuration that corresponds to a current connection context for each of the NIC's 40, and configure each NIC 40 based on the configuration 52*b* that was detected as the best match for the current context. Alternatively, if no match is detected, a user may be notified through a tool-tip message (not shown) on a net connection icon (not shown), for example.

The MIPC 300 provides a substantially efficient and extendable architecture in order to: minimize impact on the system boot time, enable users to bypass auto-detection services by specifying manually the configuration 52*b* to be applied, and provide future extensions. For example, a popup window may be provided that displays boot-time information and provide an option to bypass auto-detection. In a case whereby auto-detection may fail (e.g., noise), users may select a manual configuration. Future extensions may include parameters that define a connection's context and/or semantics based upon whether a configuration 52*b* may be auto-detected. The MIPC 300 may also include an extendibility schema.

An aspect of the MIPC service 300 substantially automates determining a mapping 314 between an address space of NIC's 40*a*–40*c*, for example, available on the computer 20 and an address space of user-defined configurations 52b. The mapping 314 may be a binary table, for example, representing an association between each member of the NIC's 40 address space and each member of the configurations 52b address space.

Figure 7A:
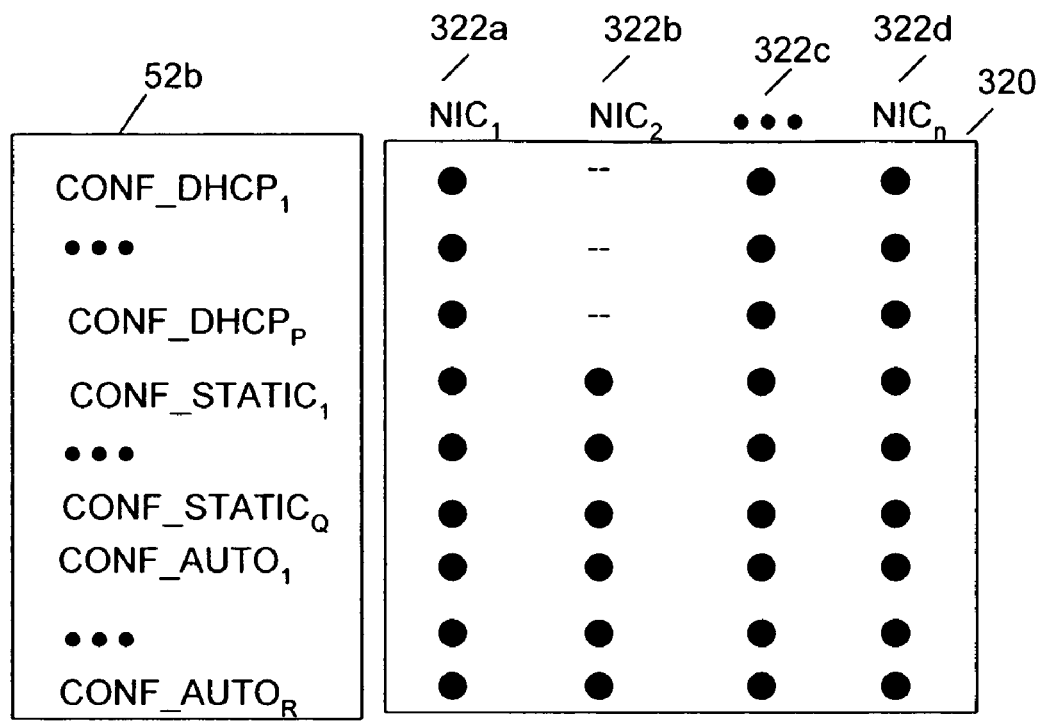
FIGS. 7a, 7b is a block diagram illustrating a mapping table for an automatic network detection and configuration system in accordance with one aspect of the present invention.

For example, referring to FIG. 7a, when the computer 20 starts up, a mapping table 320 may be set to a "1" (e.g., shown as block dot's in FIG. 7a) for configurations 52b that may be potentially valid for each NIC. As an example, a column 322b for NIC2 may be requested not to have a DHCP assigned IP address (e.g., column selection set to "0", shown as a "-" in FIG. 7a).

Figure 7B:
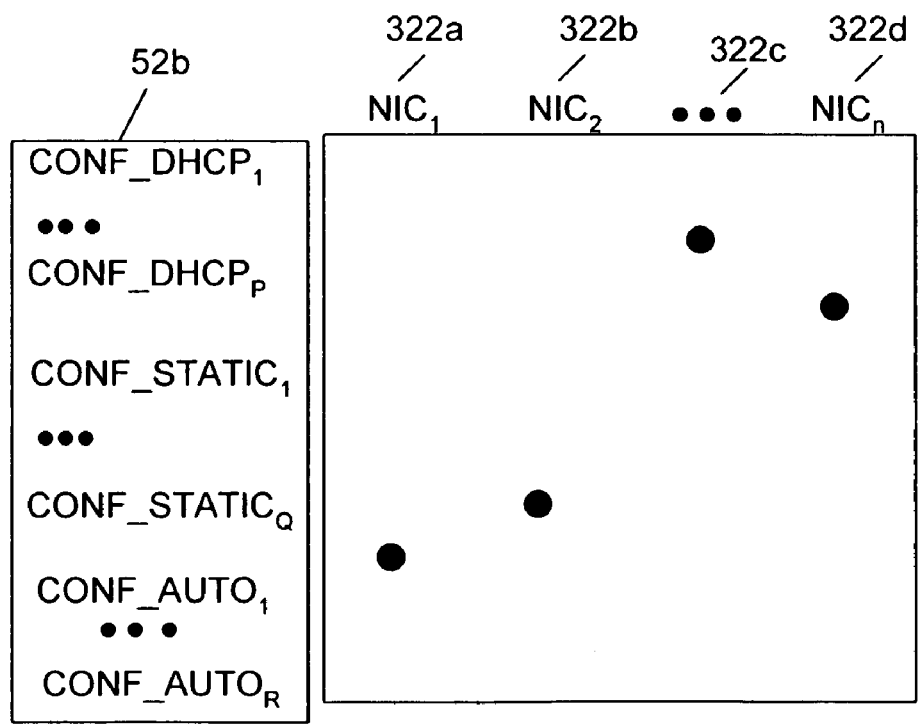

Referring now to FIG. 7b, the mapping table 320 depicts an exemplary configuration for example, after an auto-detection sequence described above, completes. The columns 322a–322d in the table generally may have a single entry set to "1" (e.g., generally, an NIC may be limited to a single configuration). Other mapping semantics may be provided as well. For, example, a row for a static configuration may be limited to a single entry set to "1" (e.g., generally, each NIC associated with a system includes a unique static address).

Figure 8A:
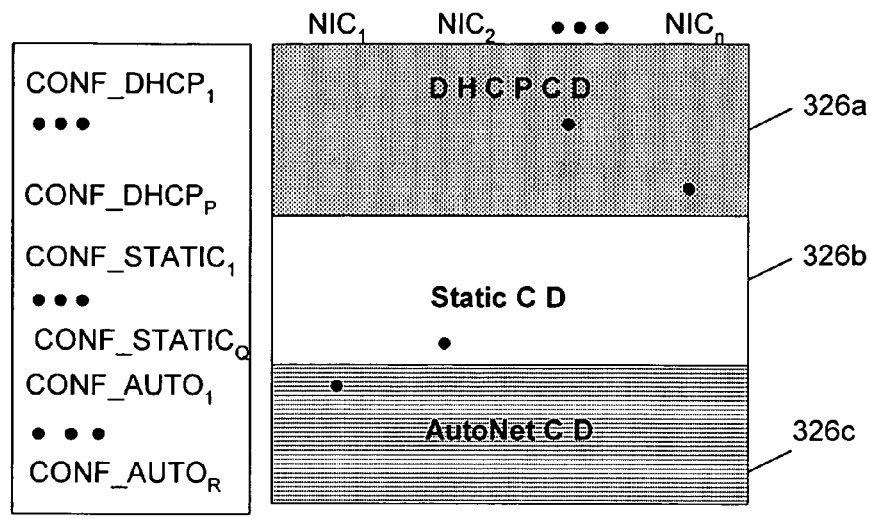
FIGS. 8a, 8b is a block diagram illustrating a configuration detector (CD) for an automatic network detection and configuration system in accordance with one aspect of the present invention.

Referring now to FIG. 8a, an exemplary illustration defines how configurations 52b may be partitioned into sets of configurations 326a–326c having similar characteristics (e.g., DHCP, Static, Autonet, etc.). Suitable configurations 52b in a partition 326a–326c may have the same structure (e.g., network parameters, default gateway, name servers, etc.) while configurations associated with other partitions may be defined differently (e.g., there may be no default gateway for an Autonet configuration).

Figure 8B:
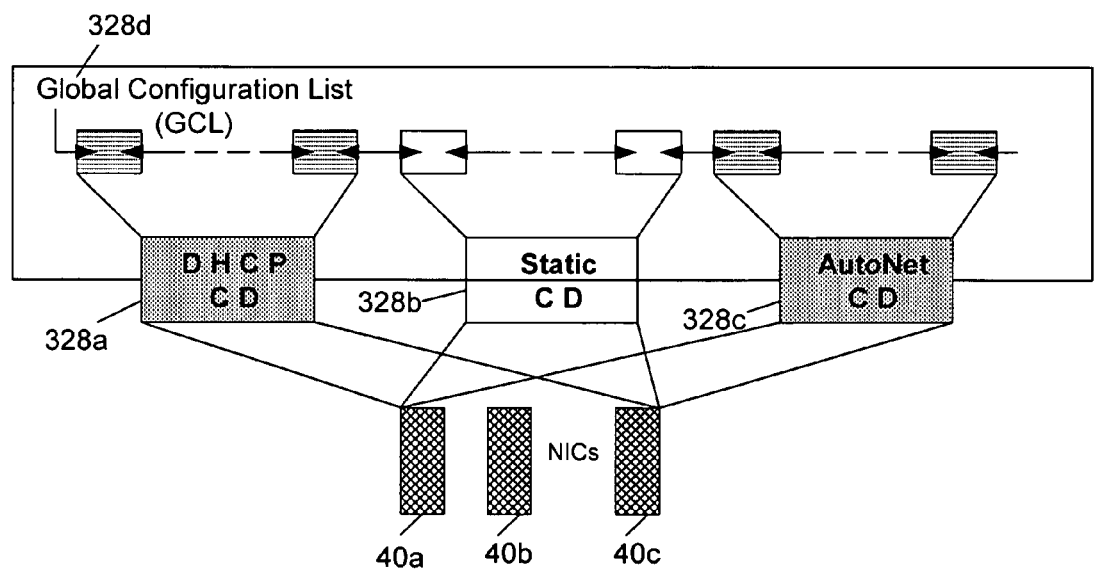

Referring now to FIG. 8b, an illustration of a possible configuration implementation is depicted. For example, upon completion of an auto-detection sequence as described above, a related code base may be employed for configurations of the same type. Consequently, the implementation may include at least one module or "configuration detector" (CD) 328a–328c per each type of configuration. For example, a suitable CD (e.g., DHCP, STATIC, AUTONET 328a–328c) may be responsible for mapping a configuration for each of the NIC's 40a–40c, if such a map is possible in the set of configurations managed by a particular CD.

Figure 9:
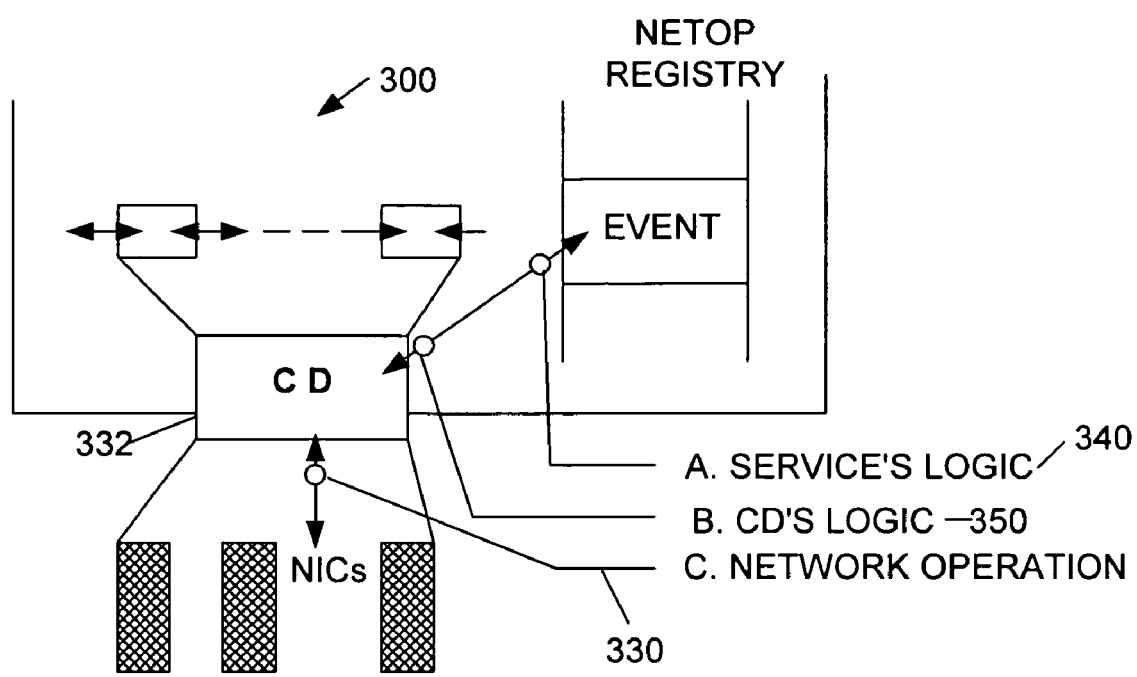
FIG. 9 is a block diagram illustrating a logic operation for an automatic network detection and configuration system in accordance with one aspect of the present invention.

Turning now to FIG. 9, an illustration of an auto-detection process and how CD execution may be provided over a network. In order to minimize bandwidth employed for auto-detection, there may be a defined a set of network operations 330 (e.g., DHCP Discover/ARP request, etc.). A CD 332 initiating a network operation 330 may register the network operation 330 with the MIPC service 300. A registration may ensure that each network operation 300 is generally not executed more than once while all CDs 332 attempt to complete operations. In the event another CD initiated similar operations, the service 300 may return a synchronization object (not shown) enabling a caller (e.g., object) to wait for the operation 330 to complete. If an auto-detection sequence comprises network operations 330 that are not specific to any Configuration Detector 332, such operations may be coded internally in the MIPCS 300 and may be invoked by any CD 332 through a similar registration process.

An internal interface (not shown) may be designed to provide a flexible interaction between the MIPC service 300 and each CD 332. Upon initialization, the MIPC 300 may initialize a variable that holds the head of a Global Configurations List (GCL) (See e.g., reference numeral 328d in FIG. 8b). The GCL loads a list of CDs 332 from a registry 336 and initializes the CD 332 by calling an entry point from the interface. The CD 332, about to be loaded, may be responsible for loading from the system registry 336 user-defined configurations of the type the CD 332 supports. Furthermore, the CD 332 may append the user-defined configurations to the GCL that is passed during the initialization phase.

The interface between MIPC 300 and CD 332, which is described in more detail below, may include an MIPC service logic portion 340 and a CD logic portion 350. The MIPC 300, for example, does not require knowledge of the structure of elements linked into the GCL. Furthermore, each of the elements in the GCL may have a different structure, depending on the configuration type and on the CD 332 that manages them. This provides for future extendibility. For example, it is sufficient for a CD 332 to implement the interface with the MIPC 300 in order to participate in the auto-detection process.

Below are exemplary code descriptions of an MIPC service logic portion 340 and a CD logic portion 350 described above.

A. Service's Logic 340:

```
RegisteredNetOp (Operation, ref event)

{
    ENTER_CRITICAL_SECTION;
    if(Operation not in NetOp Registery)
    {
        create Operation.evnt;
        store Operation in NetOp Registry;
        event = Operation.evnt;
        OpDuplicated = FALSE;
    }
    else
    {
        get original Operation from NetOp Registry;
        event = Operation.evnt;
        OpDuplicated = TRUE;
    }
    LEAVE_CRITICAL_SECTION;
    Return OpDuplicated;
}
```

B. CD's Logic 350:

```
ExecuteNetOp (Operation)

HANDLE event;
...
if(!RegisteredNetOp (Operation, event))
{
        perform net operation;
        ...
        fill up Operation data in NetOp Registry;
        signal event;
}
else
{
        wait on event;
}
...
Use Operation data
...
```

What has been described above are preferred aspects of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A method that automates detection and configuration of network parameters, comprising:
   querying a network, the network comprising a plurality of network systems wherein respective network systems include a delay timer with a delay time based on a value of an associated address;
   receiving a response from the network; and configuring a network interface before a network identification has been established based upon the response from the network.

2. The method of claim 1 further comprising: determining a network identification associated with the response; and matching at least one configuration associated with the network identification.

3. The method of claim 1, the query is at least one of a multicast and a broadcast.

4. The method of claim 1, the query is an Address Resolution Protocol (ARP) broadcast.

5. The method of claim 1, the response is at least one of a multicast and a broadcast.

6. The method of claim 1, further comprising starting a local timer to determine if a response has been received.

7. The method of claim 1, further comprising starting at least one network system delay timer in order to mitigate network traffic.

8. A system that automates detection and configuration of network parameters, comprising:
   a first computer system with a network interface;
   a storage that stores at least one configuration associated with a network;
   at least a second computer system that provides network information to the first computer system; and
   a Multiple Internet Protocol Configurations (MIPC) service that matches the at least one configuration with a network identification associated with the network information, wherein the first computer configures the network interface based on the matched configuration.

9. The system of claim 8 the Multiple Internet Protocol Configuration (MIPC) service comprising a set of configuration based on at least one of past network configuration and predetermined configurations, the set utilized to match to the network identification.

10. The system of claim 8, the network interface is at least one Network Interface Card (NIC).

11. The system of claim 8, the NIC is mapped to the at least one configuration by the MIPC service.

12. The system of claim 11, the NIC is mapped via a binary table.

13. The system of claim 12, further comprising at least one configuration detector (CD) that provides an association between the NIC and the at least one configuration.

14. The system of claim 13, the configuration detector initiates a network operation by registering the network operation with the MIPC service.

15. The system of claim 8, the at least one configuration further comprises at least one of an Internet Protocol (IP) address, a subject mask, a gateway address, a DHCP server, and a name server.

16. A system that automates detection and configuration of network parameters, comprising:
   a first computer system having a network interface;
   a storage that stores at least one configuration associated with a network;
   a second computer system that provides network information; and
   a third computer system without a network identification;
      wherein the first computer system queries the second computer system via the network interface to receive the network information before a network identification has been established for the first computer system;
      the first computer system configures the network interface by determining a network identification associated with the network information and matching the at least one configuration with the network identification; and
      the third computer system determines a network configuration via communications from at least one of the first computer system and the second computer system.

17. The system of claim 16, the query is a multicast.

18. The system of claim 16, the query is an Address Resolution Protocol (ARP) broadcast.

19. The system of claim 16, further comprising a router that transmits network configuration information periodically.

20. The system of claim 16, the query requests and responses are multicast over different addresses.

* * * * *

UNITED STATES PATENT AND TRADEMARK OFFICE
CERTIFICATE OF CORRECTION

PATENT NO. : 7,051,087 B1
APPLICATION NO. : 09/587204
DATED : May 23, 2006
INVENTOR(S) : Pradeep Bahl et al.

Page 1 of 1

It is certified that error appears in the above-identified patent and that said Letters Patent is hereby corrected as shown below:

In column 16, line 1, in Claim 11, delete "claim 8" and insert -- claim 10 --, therefor.

In column 16, line 14, in Claim 15, delete "subject" and insert -- subnet --, therefor.

Signed and Sealed this

Twentieth Day of July, 2010

David J. Kappos
*Director of the United States Patent and Trademark Office*